United States Patent [19]

Nakamura

[11] 3,897,366

[45] July 29, 1975

[54] AUTOMOTIVE EXHAUST GAS CATALYST

[75] Inventor: Harutoki Nakamura, Toyonaka, Japan

[73] Assignee: Matsushita Electric Industrial Co., Ltd., Kadoma-shi, Japan

[22] Filed: Nov. 5, 1973

[21] Appl. No.: 412,961

Related U.S. Application Data

[63] Continuation of Ser. No. 163,939, July 19, 1971, Pat. No. 3,811,845.

[30] Foreign Application Priority Data

July 30, 1970  Japan.............................. 45-67146
July 30, 1970  Japan.............................. 45-67147
May 12, 1971  Japan.............................. 46-32076

[52] U.S. Cl........... 252/454; 252/477 R; 423/213.2; 423/213.5
[51] Int. Cl............................................ B01f 11/06
[58] Field of Search ....... 252/477 R, 454; 23/288 F; 106/55; 423/213.2, 213.5

[56] References Cited

UNITED STATES PATENTS

| 3,154,388 | 10/1964 | Purse.................................. 23/288 F |
| 3,189,563 | 6/1965 | Hauel............................... 252/466 B |
| 3,220,794 | 11/1965 | Stiles................................ 23/288 F |
| 3,308,072 | 3/1967 | Harrington et al............... 252/477 R |
| 3,397,154 | 8/1968 | Talsma............................. 423/213.2 |
| 3,495,950 | 2/1970 | Barber ............................ 252/477 R |

OTHER PUBLICATIONS

Richardson et al., General College Chemistry. N.Y., Henry Holt & Co., 1940, page 411.

*Primary Examiner*—Winston A. Douglas
*Assistant Examiner*—W. J. Shine
*Attorney, Agent, or Firm*—Stevens, Davis, Miller & Mosher

[57] ABSTRACT

A plurality of glass fiber bodies of alkaline-free glass fibers containing an exhaust gas catalyst in which the bodies are separated by heat conductive metal partitions.

3 Claims, 10 Drawing Figures

AUTOMOTIVE EXHAUST GAS CATALYST

This is a continuation of application Ser. No. 163,939, filed July 19, 1971, now U.S. Pat. No. 3,811,845.

BACKGROUND OF THE INVENTION

The present invention relates to generally an atmospheric pollution control equipment and more particularly a vehicle exhaust control equipment.

One of the objects of the present invention is to provide an improved vehicle exhaust control equipment of the type using the catalysts to convert the pollutants such as carbon monoxide, unburnt hydrocabons and nitrogen oxides in the exhaust gases from an automobile engine into harmless gases.

Another object of the present invention is to provide an improved vehicle exhaust control equipment which is very effective in eliminating the pollutants in the exhaust gases for the purpose of atmospheric pollution control.

Another object of the present invention is to provide an improved vehicle exhaust control equipment which may effectively dissipate the heat produced in the catalytic oxidations so that the thermal breakdowns of the catalysts may be prevented and the long service life of the equipment may be ensured.

Another object of the present invention is to provide an improved vehicle exhaust control equipment which may be manufactured in a simple manner at less cost.

SUMMARY OF THE INVENTION

Briefly stated, a vehicle exhaust control equipment in accordance with the present invention uses mesh-like catalysts whose carriers are fabrics of glass fibers and is characterized in that the casing is divided into more than two parallel small catalyst chambers into which are packed said mesh-like catalysts.

According to one feature of the present invention, the glass fiber fabrics are woven from highly heat-resisting glass fibers whose alkalines are eliminated to increase silica contents.

According another feature of the present invention, the small catalyst chambers are of box-shaped and disposed on both sides of an exhaust gas introduction passage connected to an inlet of the casing.

According to another feature of the present invention, the equipment has a cylindrical casing which is divided into more than two small catalyst chambers by a plurality of doughnut-shaped partition walls, and the mesh-like catalysts are wound around the exhaust gas introduction passage.

According to another feature of the present invention, the last of the plurality of partition disks has no center aperture so as to close the exhaust gas introduction passage, and the last chamber defined between this last partition disk and the side wall on the side of the discharge end of the cylinder is not packed with the mesh-like catalysts and is used as a chamber for discharging the exhaust gases, which have been made in contact with the mesh-like catalysts, into a discharge pipe connected to a muffler or the like.

According to another feature of the present invention, the exhaust gas introduction passage is gradually reduced in cross section toward the discharge end of the casing.

DESCRIPTION OF THE PREFERRED EMBODIMENTS

Figure 1:
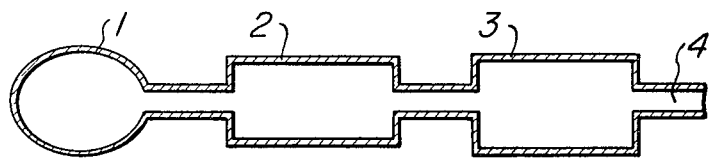
FIG. 1 is a block diagram of a system for cleaning or purifying the exhaust gases from an automobile engine.

In FIG. 1 is shown in block diagram the prior art vehicle exhaust control equipment for eliminating or purifying the pollutants included in the vehicle exhaust gases. The exhaust gases from an automobile engine 1 is introduced through an exhaust pipe into an exhaust control equipment 2, where the exhaust gases are purified. The purified gases are introduced into a muffler 3 where the sound of the gases is attenuated and the temperature of the gases is reduced, and the exhaust gases are finally discharged into the surrounding atmosphere through an exhaust pipe 4.

Figure 2:
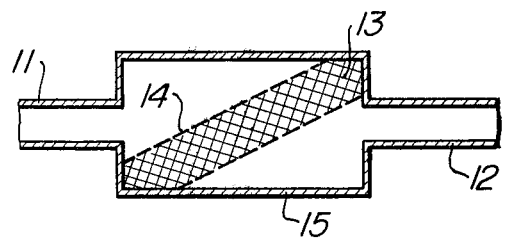
FIG. 2 is a diagrammatic sectional view of the prior art vehicle exhaust control equipment designated by 2 in FIG. 1.

In FIG. 2 is shown in section the exhaust control equipment 2 comprising a box-shaped casing 15 with a volume of 4 – 5 liters and a connecting pipe 11 connected to the manifold of the automobile engine and a connecting pipe 12 connected to the muffler. A pair of spaced-apart perforated metal plates or screens 14 are disposed in the casing 15 to define a space of one or two liters in which the catalysts are packed.

The catalysts generally comprise the very porous carriers consisting of the particles of alumina, silica or magnesia which are sintered at elevated temperatures and coated or mixed with platinum and the metal oxides such as copper, nickel, manganese, cobalt and iron oxides. However, recently it has been found out that the newly developed glass fiber catalysts are more effective to purify the exhaust gases. The carriers of these catalysts comprise the mesh fabrics of glass fibers or glass fiber fabrics (to be referred to as "heat-resisting glass fiber fabrics" hereinafter) of the type in which all of alkalines in glass fibers are eliminated by dipping these glass fibers in a strong acid bath whereby they may become rich with silica and may be rendered heat resistive with an increased activated surface area. To these carriers is applied platinum or the above described metal oxides. Therefore the problem is now how to provide the effective exhaust control equipment with the use of these mesh fabrics of glass fibers or heat-resisting glass fibers.

Figure 3A:
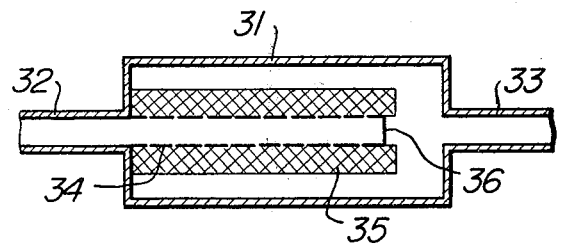
FIG. 3a is a diagrammatic longitudinal sectional view of another prior type vehicle exhaust control equipment.
Figure 3B:
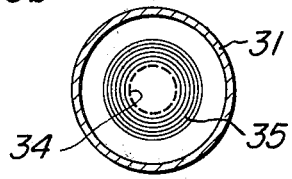
FIG. 3b is a cross sectional view thereof.

One arrangement of the prior art exhaust control equipment is illustrated in FIGS. 3a and 3b. Within a cylindrical casing 31 having a feed pipe 32 and a discharge pipe 33 is disposed a perforated pipe 34 with a perforated area being 20–50% of the total surface area. One end of the perforated pipe 34 is connected to the feed pipe 32 while the other end is closed by a plug or the like. The mesh-fabric type catalysts 35 of the type described above are wound around the perforated pipe 34 coaxially thereof. The weight of these catalysts is about 400–800 grams. The exhaust gases fed through the feed pipe 32 into the perforated pipe 34 are discharged through the perforations thereof, made into contact with the catalysts 35 and discharged into the discharge pipe 33.

The inventors made extensive studies and experiments in order to make full use of the catalysts in the reactions within the casing and also to prevent the temperature of the catalysts from being elevated by the heat dissipated from the exhaust gases, and succeeded in providing an excellent vehicle exhaust control equipment as will be described hereinafter with reference to FIGS. 4–7.

Figure 4A:
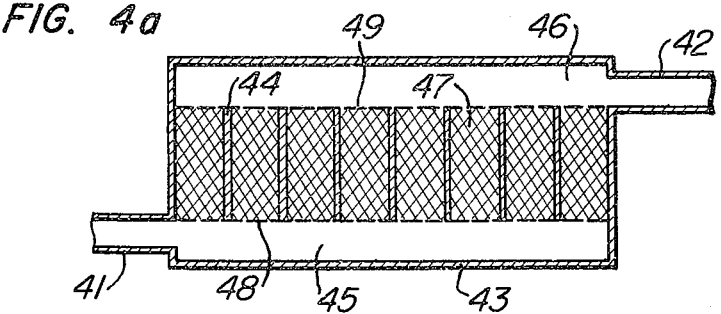
FIG. 4a is a diagrammatic longitudinal sectional view of a first embodiment of the present invention.
Figure 4B:
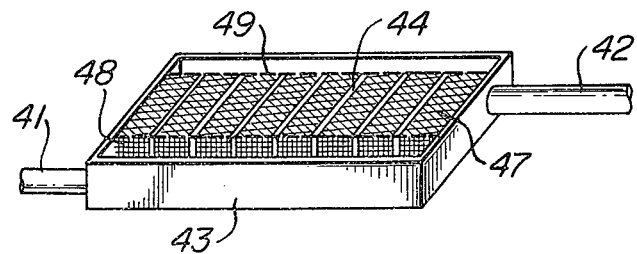
FIG. 4b is a perspective view thereof with a top cover removed.

A first embodiment is shown in FIG. 4. Within a box-shaped casing 43 are disposed in parallel a plurality of small-sized chambers or units of the mesh-fabric type catalysts 47 of the type described, the adjacent catalyst units 47 being separated from each other by means of partition walls 44. These catalyst units 47 are sandwiched between a pair of perforated metal plates or wire screens 48 and 49. The axis of each of the rolled catalyst units 47 may be in parallel with the direction of the flow of the exhausted gases or the axis of the rolled catalyst unit 47 may be perpendicular to the direction of the exhaust gas flow so that the outer surface of the rolled catalyst unit 47 may be perpendicular to the axis of the passage 45. A number of the rolled catalyst units 47 is dependent upon the types of automotive engines, and is preferably 2–8.

Figure 5:
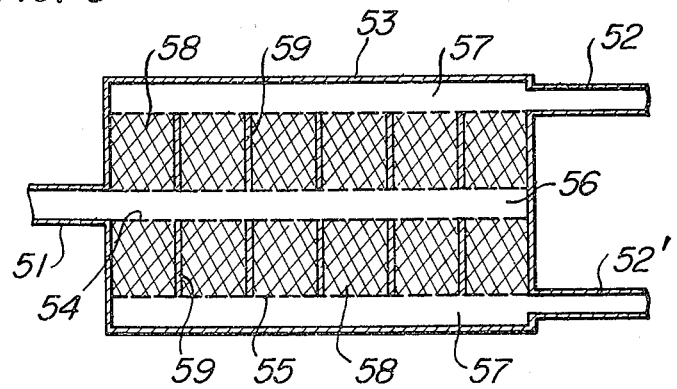
FIG. 5 is a diagrammatic longitudinal sectional view of a second and fourth embodiments of the present invention.

A second embodiment of the present invention is shown in FIG. 5. A plurality of rolled catalysts units 58 similar to those 47 in the first embodiment described by reference to FIG. 4 are disposed in parallel on each side of an exhaust gas introduction passage 56 in communication with a feed pipe 51 of a box-shaped casing 53. The exhaust gases which have made contact with the catalysts 58 are discharged through the exhaust gas passages 57 into the discharge pipes 52 and 52' which are connected to a single pipe connected to a muffler. As in the case of the first embodiment, the catalyst units 58 are sandwiched by a pair of perforated metal plates or wire screens 54 and 55 and are separated from each other by partition walls 59.

Figure 6:
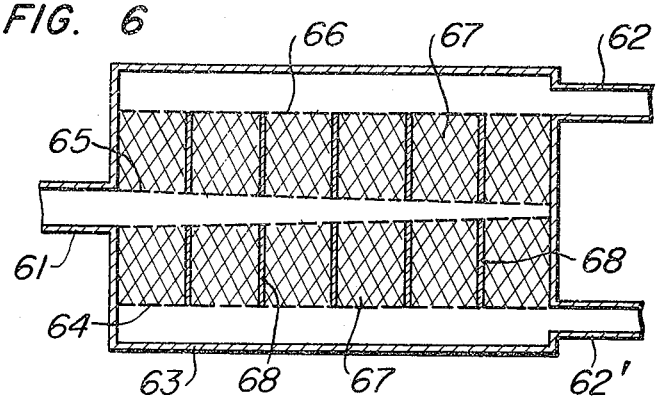
FIG. 6 is a diagrammatic longitudinal view of a third and fifth embodiments of the present invention.

A third embodiment shown in FIG. 6 is similar to the second embodiment described above by reference to FIG. 5 except that the cross sectional area of the central exhaust gas passage is gradually reduced from a feed pipe 61 toward the rear side of a box-shaped casing 63 on the side of its discharge pipes 62 and 62' which are also connected to a single pipe connected to a muffler. The catalyst units 67 are also sandwiched between the perforated metal plates or wire screens 64 and 65 and are separated from each other by the partition walls 68.

A fourth embodiment of the present invention will be described by reference to FIG. 5 because its longitudinal sectional view is substantially similar to that of the second embodiment. Whereas the second embodiment has the box-shaped casing, the fourth embodiment has a cylindrical casing 53 about 230 mm in diameter, and the mesh fabric type catalysts 58 of the type described above are wound around a perforated pipe 54 within the casing 53 connected to the feed pipe 51. The exhausted gases are discharged into the discharge pipes 52 and 52' from the cylindrical casing 53.

A fifth embodiment of the present invention will be described by reference to FIG. 6 because its longitudinal sectional view is substantially similar to that of the third embodiment. Whereas the third embodiment has a box-shaped casing, the fifth embodiment has a cylindrical casing 63. The diameter of the passage 65 is gradually reduced as in the case of the third embodiment. Each catalyst unit 67 and each partition wall are both in the form of a doughnut. In the third and fifth embodiments, the space of the catalyst unit is increased as it approaches toward the discharge end of the casing, but the purpose of the gradually reduced-diameter passage at the center of the casing is to prevent the exhaust gases deflected at the rear end of the passage from entering in large quantity into the last catalyst unit or units as compared with the exhaust gases which enter into the preceding units. Therefore the density of the catalysts in the last unit or units is preferably reduced. In the third embodiment where 12 catalyst units are disposed, the ratio of the weight of the catalysts in the first unit to that of the last unit is preferably 1.45:1 while in the fifth embodiment where 6 disk-shaped catalyst units are disposed, the ratio is preferably 1.35:1.

In Table 1 below, the number of catalyst units and the weight of the catalysts in the first, second, third, fourth and fifth embodiments are shown.

Table I

| embodiments | number of units | Total weight of catalysts in grams |
| --- | --- | --- |
| First | 8 | 720 |
| second | 12 | 600 |
| third | 12 | 600 |
| fourth | 6 | 540 |
| fifth | 6 | 540 |

Figure 7A:
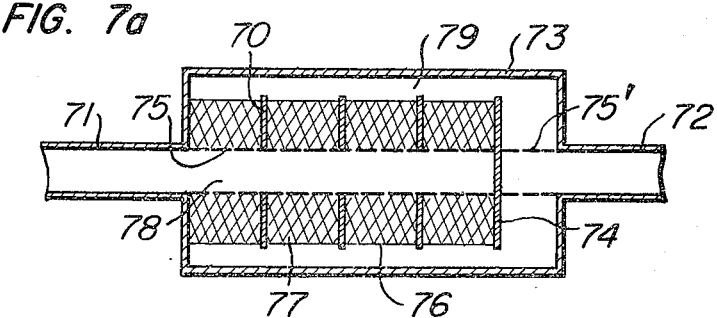
FIG. 7a is a diagrammatic longitudinal sectional view of a sixth embodiment of the present invention.
Figure 7B:
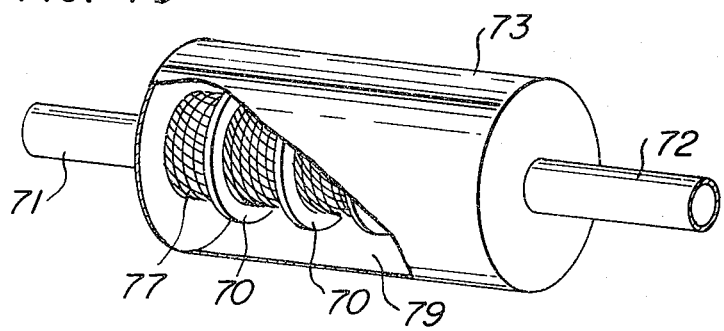
FIG. 7b is a perspective view thereof with a part of the casing wall being broken away.

Next a sixth embodiment of the present invention will be described by reference to FIGS. 7a and 7b. A cylindrical casing 73 has a feed pipe 71 and a discharge pipe 72, and mesh-fabric type catalysts 77 of the type described above are wound around a perforated pipe 78 in the casing 73 and are separated from each other by partition disks 70. It should be noted that the last partition disk 74 closes the perforated pipe 78 so that the exhausted gases will be prevented from directly passing into the discharge pipe 72 without passing through the catalyst units 77. Another perforated pipe 75' is disposed between the last partition disk 74 and the discharge pipe 72 so that the exhaust gases which passed through the catalyst units 77 may enter into the perforated pipe 75' before they are discharged into the discharge pipe 72. The weight of the catalysts in each unit is 120 grams so that the total weight of the catalysts in four units is 480 grams. The exhaust gases introduced into the perforated pipe 78 through the feed pipe 71 are made to pass through the catalyst units 77 and then discharged into a muffler through the perforated pipe 75' and the discharge pipe 72.

In the above embodiments, an air pump or air blower has not been described which is driven by the automobile engine or the battery to feed the air into the exhaust control equipment in order to oxide CO, HC and the like in the exhaust gases which are not completely burnt in the engine, because such an air pump or blower is well known in the art and is required not only in the vehicle exhaust gas control equipment of the present invention but also in other prior art equipments. Although not specifically stated in the specification, it is clear to those skilled in the art to provide a double-wall casing and place heat insulating materials between the walls or to apply them on the outer surface of the casing because the activity of the catalysts is generally highly dependent upon a temperature and the desired temperature must be maintained within the casing. It is of course also obvious to those skilled in the art to provide, depending upon the characteristics of the catalysts used, heat dissipating means when the exhaust control equipment is used under some special environmental conditions or when the heat resistivity of the catalysts is low.

The following advantages are accrued from the present invention:

1. A plurality of small-sized catalyst units are disposed in parallel so that the cleaning or purification effect may be much improved as compared with the prior art exhaust control equipment in which the catalysts of the same weight are placed in one position. This advantage will become apparent when the space velocity is used for explanation. That is, in case of the platinum catalysts 10 grams in weight carried by the heat-resisting glass fibers the space velocity is 4.8 times that of the catalysts 100 grams in weight used in the prior art exhaust control equipment. Furthermore it was found out that the cleaning efficiency is much lowered in the prior art exhaust control equipment where the catalysts more than 500 grams in weight are packed in one space as compared with the exhaust control equipment of the present invention in which these catalysts are divided into units each containing 60–100 grams and disposed in parallel. In other words, by the parallel arrangement of the small-sized catalyst units, the cleaning or purification effect may be much improved while the exhaust control equipment may be made compact in size.

2. By use of the partition walls or disks, the uniform temperature rise in the equipment may be attained. Furthermore, the temperature rise may be minimized. The reason is that the partition walls or disks are made of metal and are placed adjacent to the heating catalysts so that the heat dissipation by the metal partition walls or disks may be much enhanced and the abnormal temperature rise of the catalysts may be prevented. Therefore the local thermal breakdowns of the catalysts may be effectively prevented.

3. The temperature rise may be further reduced in case of the first, second and third embodiments because the casings are made in direct contact with the catalysts.

4. In the third and fifth embodiment, the exhaust gas passage is gradually reduced in diameter from the feeding end toward the discharge end so that the volumes of the exhaust gases introduced into individual catalyst units or chambers may be uniformly distributed. Therefore the temperature rises in the catalyst units may be made uniform and the local thermal breakdowns of the catalysts may be effectively prevented.

5. In the fourth, fifth and sixth embodiment, the cylindrical casings are employed so that the fabrication may be simplified at less cost.

The advantages of the present invention will become more apparent from the data given in Table II below. The data were obtained by a gasoline-engine automobile which were fitted with the vehicle exhaust control equipments of the first to sixth embodiments of the invention during the travel of about 500 kilometers. The displacement of the engine was 1,500 cc. For the same of comparison, the data of the vehicle exhaust control equipment of the type shown in FIG. 3 with 1,400 grams of the mesh-fabric type heat-resisting-glass-fibler-carrier catalysts are shown also in Table II. The catalysts used are as follows:

Carriers:mesh-fabrics of heat-resisting glass fibers
Catalysts:metal oxides whose major portions are cobalt oxides and copper oxides and which contain as auxiliary catalysts small quantities of chrominum oxides, aluminum oxides, magnesium oxides and phosphorus.

Table II

| | idling after 500 km travel | | | | |
|---|---|---|---|---|---|
| comparison (See FIG. 3) | weight in catalysts in grams | Average CO purification rate in % | Co in % at inlet | CO in % at outlet | average temperature of catalysts in °C |
| first embodiment | 1,400 | 68 | 1.2 | 0.6 | 680 |
| | 720 | 92 | 1.4 | 0.3 | 540 |
| second embodiment | 600 | 94 | 1.5 | 0.2 | 570 |
| third embodiment | 600 | 94 | 1.7 | 0.3 | 490 |
| fourth embodiment | 540 | 93 | 0.8 | 0.15 | 610 |
| fifth embodiment | 540 | 90 | 1.0 | 0.2 | 630 |
| sixth embodiment | 480 | 95 | 1.1 | 0.15 | 590 |

In all of the embodiments described above, the numbers of small-sized catalyst units or chambers as well as the weights and types of the catalysts used are specified, but it is understood that the arrangements of more than two small-sized catalyst units or chambers in parallel are within the scope of the present invention. It is also understood that the types and weights of the catalysts are of course selected depending upon the types of the automobiles and that the catalysts may be of the type in which platinum or metal oxides are applied as the catalyst layers upon the surfaces of the fabrics woven from the heat-resisting glass fibers. It is also understood that the gradual reduction in diameter of the perforated pipe 78 in the sixth embodiment is also within the scope of the present invention.

The vehicle exhaust control equipment in accordance with the present invention may be fabricated at less cost and has an excellent exhaust gas cleaning or purification effect, and is very effective as an antiatmospheric pollution control equipment.

What is claimed is:

1. A catalyst for the treatment of automobile exhaust gas comprising a plurality of bodies of woven mesh of glass fibers which are etched to remove alkalinity thereby forming a high silica glass, a deposit of catalytic material selected from the group of metals, metal oxides or mixtures thereof on said fibers in which said catalytic material oxidizes carbon monoxide and hydrocarbons and reduces nitrogen oxides in automobile exhaust gas and heat conductive metal partitions subdividing said bodies to dissipate the heat therefrom.

2. A catalyst according to claim 1 wherein said bodies are in a box shape.

3. A catalyst according to claim 1 wherein said bodies are in a rolled, annular shape.

* * * * *